March 30, 1937.  G. E. SMITHBURN  2,075,367
LIGHT PROJECTOR
Filed March 29, 1935  2 Sheets-Sheet 1
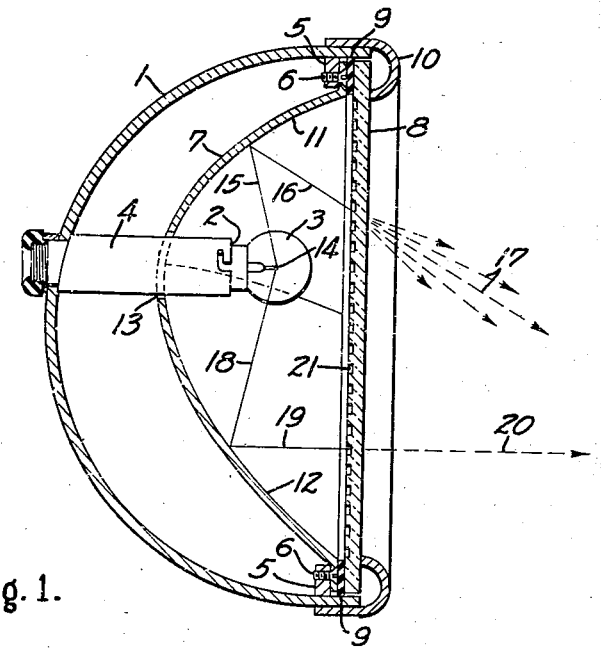
Fig. 1.
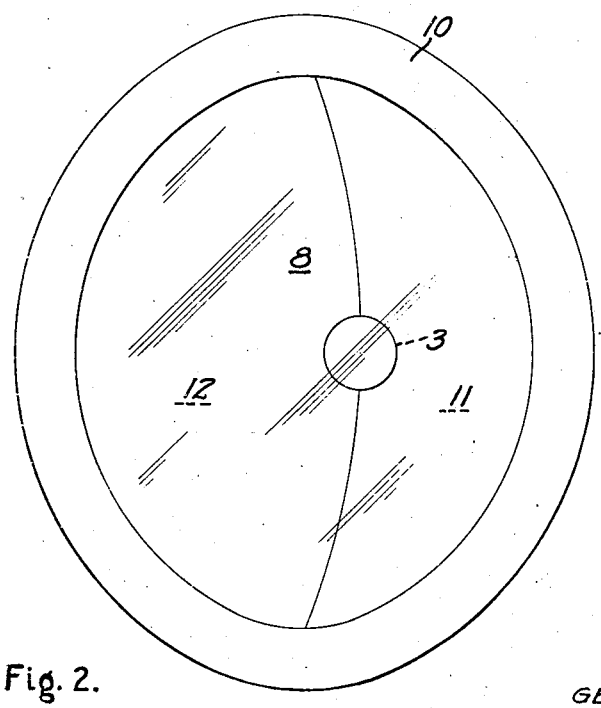
Fig. 2.
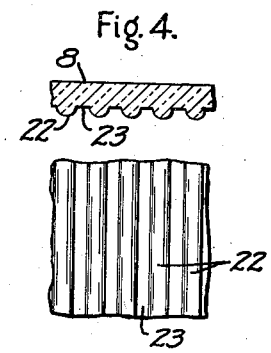
Fig. 4.
Fig. 3.
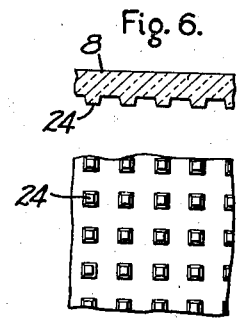
Fig. 6.
Fig. 5.
INVENTOR
GEORGE E. SMITHBURN
BY Charles O. Bruce
HIS ATTORNEY March 30, 1937.   G. E. SMITHBURN   2,075,367
LIGHT PROJECTOR
Filed March 29, 1935   2 Sheets-Sheet 2

INVENTOR
GEORGE E. SMITHBURN
BY Charles O. Bruce
HIS ATTORNEY

Patented Mar. 30, 1937

2,075,367

UNITED STATES PATENT OFFICE 2,075,367

LIGHT PROJECTOR

George E. Smithburn, Berkeley, Calif.

Application March 29, 1935, Serial No. 13,648

3 Claims. (Cl. 240—41.3)

My invention relates to light projectors and more particularly to projectors for use as automobile headlights and aeroplane landing-lights.

The prime function of a light projector is to receive and redirect light flux emitted by a source for the purpose of distributing the available flux in desired proportions upon specified objects or in specified directions. Corresponding to any directed distribution of light flux from a point in space a diagram may be drawn or conceived in which lines directed outwardly from the point represent by their length the candlepower emitted by the projector in the line direction.

In practice the diagram best suited to the illumination requirements is known or may be determined, but the problem is to design a projector which will project light flux as nearly as possible in accord with that diagram. For some purposes, a projector is required which is capable of adjustment in order that the distribution of flux therefrom may be altered in accordance with desires of the user.

Lighting of the roadway ahead of an automobile presents a typical illumination problem which I cite as an example. For this purpose a considerable proportion of the available flux should fall upon the roadway in a narrow band extending from the vehicle to a point several hundred feet ahead. It is important that substantially all of the forwardly projected flux be directed below eye-level of approaching drivers in order to avoid the dangerous blinding condition called "glare". In addition a part of the available flux should fall upon the ground on either side of the vehicle and for a short distance ahead in order that the driver may be aware of his position relative to the edge of the road.

Lighting of the ground beneath a descending aeroplane requires not only a different distribution of light flux but the most suitable distribution will vary with the character of the ground and the altitude of the craft. When the aeroplane is at a considerable altitude a relatively intense beam of nearly parallel rays is best suited to enable the pilot to determine his height and to judge the character of the ground and nearby obstructions thereon. As the craft descends, however, the area marked out by the illumination of the beam becomes less and, therefore, it is desirable that the flux be distributed over a wider area to afford safety in landing. Hence for this application a projector adapted to vary the distribution of emitted light flux in a particular manner is desired.

As a solution to problems of this nature, it has heretofore been proposed to employ a projector having a number of reflecting surfaces for directing a plurality of light beams divergently outward, each beam having an intensity equal to that at the corresponding point on the ideal flux distribution diagram. By this method, however, little light flux is emitted in directions other than those coinciding with the beam axes and consequently the ideal distribution diagram is but crudely approximated.

My present invention on the other hand overcomes these deficiencies by the provision of a projector which will emit a plurality of directed beams each composed of light rays forming a spatial light-intensity pattern, the various beam patterns being so related that the super-positioning of all will yield a resultant intensity distribution diagram in space closely approximating the ideal desired.

It is, therefore, an important object of my invention to provide a light projector which will emit a plurality of light beams in divergent directions, the rays of one of the beams being dispersed in accordance with a predetermined light intensity distribution diagram.

Another object of my invention is to provide a light projector which will emit two light beams, the rays forming one of the beams being dispersed in accordance with a predetermined light-intensity distribution diagram and the angle between the two beam axes being adjustable.

A further object of my invention is to provide a head-light for a vehicle which will emit a forwardly directed light beam, substantially none of the rays of which are directed above the roadway, and a beam of dispersed rays of light directed toward the side for illuminating the edge of the road.

Still another object of my invention is to provide a light projector for a vehicle which will emit a forwardly directed light beam and a side beam of dispersed rays of light, the angle between the axes of the beams being variable.

An additional object of my invention is to provide a landing light for an aircraft which will emit a plurality of light beams in divergent directions, the rays of one of the beams being dispersed in accordance with a predetermined light-intensity distribution diagram.

Another object of my invention is to provide a light projector for aircraft which will emit a plurality of light beams, the rays of one of the beams being dispersed in accordance with a predetermined light-intensity distribution diagram and the angle between the axis of one of the beams and the axis of the projector being variable.

A further object of my invention is the provision of a light projector of the character described, composed of few and simple parts and which can be economically manufactured.

Other objects and advantages of my invention will be apparent from the following description, forming a part of this specification, but I do not limit myself to the particular embodiment of my invention herein described as various forms may be adapted within the scope of the claims.

Referring to the drawings:

Figure 1 is a vertical sectional view of a light projector embodying one form of my invention in which the reflectors are in fixed angular relation one to another.

Figure 2 is a front elevational view of the projector shown in Figure 1.

Figure 3 is a view in elevation of a fragment of a dispersion lens, illustrating one form of surface contour.

Figure 4 is a transverse sectional view of Figure 3.

Figure 5 is similar to Figure 3 but illustrates a lens having a different form of surface contour.

Figure 6 is a transverse sectional view of Figure 5.

Figure 9:
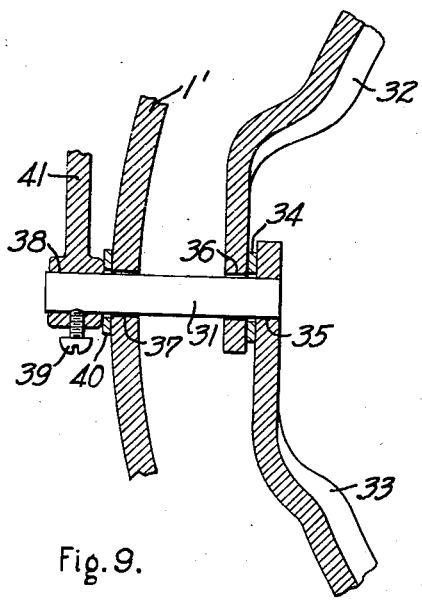
Figure 9 is a transverse sectional view taken in the plane indicated by line 9—9 in Figure 7 and shows in detail the means employed to mount the reflectors for rotary movement within the casing.

In terms of broad inclusion the light projector of my invention comprises a plurality of reflectors joined together. Means are provided whereby a light source may be mounted in spaced relation to these reflectors and other means are provided for dispersing light projected from one of these reflectors.

In greater detail, and with reference to the particular construction illustrated in Figures 1 and 2 of the drawings, my device comprises a conventional bowl-shaped casing 1 having a lamp socket 2, adapted to hold an electric lamp 3, mounted therein on a support 4. In accordance with customary practice, means comprising tapped lugs 5 and holding screws 6 are provided for fastening a reflector body 7 to the casing, and a lens 8, forming a closure for the open end of the casing, is held in place against a resilient gasket 9 by the rim 10.

The reflector body 7, preferably formed of sheet metal, is shaped within its concave surface to produce the reflectors 11 and 12. A hole 13 is provided at the closed end of the reflector body to permit the socket support 4 to project therethrough. The reflectors 11 and 12 preferably conform in shape to portions of the surfaces of confocal paraboloids having angularly related axes intersecting at the point occupied by the filament 14 of the lamp 3, so that light falling on the surface of one of the reflectors from the filament will be reflected outwardly in a direction parallel to the axis of the corresponding paraboloid, as illustrated by the traces 15—16 and 18—19 of the light rays in Figure 1. While I have shown a preferred form and arrangement of the reflectors, it is to be understood that other forms and arrangements may be employed without departing from the spirit of my invention. Thus, the reflectors may, if desired, be formed as portions of the interior surface of the casing itself; they may be disposed in spaced relation as to foci; and they may be shaped other than paraboloidally.

Means are provided for dispersing light projected from one of the reflectors. The dispersion means employed in the preferred form of my invention comprises a plate 8, of transparent material, adapted to form a closure for the open end of the casing and having one surface formed in uneven contour. I have illustrated the uneven surface in Figure 1 as formed of a plurality of transverse, rectangular channels 21 in the inner surface of the plate. Such formation permits all incident light rays lying in horizontal planes perpendicular to the surface of the plate to pass through with substantially no dispersion; of incident rays lying in all other planes, a considerable proportion will emerge dispersed. This is illustrated by the trace 19 of a ray of light, incident in a vertical plane normal to the surface, which emerges as the undispersed ray 20; the light ray along the trace 16, on the other hand, lies in a vertical plane making an acute angle with the surface, and consequently emerges in divergently dispersed rays 17. In general, the particular formation chosen for the surface of the plate will depend upon the dispersion pattern desired. Thus, vertical ridges 22 of hemispherical section, illustrated in Figure 3, tend to disperse all incident rays into a horizontal plane, whereas the flat surface 23, separating the ridges, pass undispersed all light rays incident to the surface at angles greater than the critical angle determined by the refractive index of the material of which the plate is composed. Protuberances 24, illustrated in Figure 5, having the form of truncated pyramids, tend to scatter light incident upon the sides thereof in what may be termed circular dispersion, that is, dispersion in all planes containing the incident ray.

While I have shown and described dispersion means comprising a plate of transparent material having an uneven surface, it is to be understood that other dispersion means may be employed without departing from the spirit of my invention. Thus, for example, I include within the scope of my claims, dispersion means comprising a plate of transparent material having reflecting or refracting particles embedded therein as well as dispersion means comprising furrows, dentelations or chemical frosting superposed upon the surface of a reflector.

Figure 7:
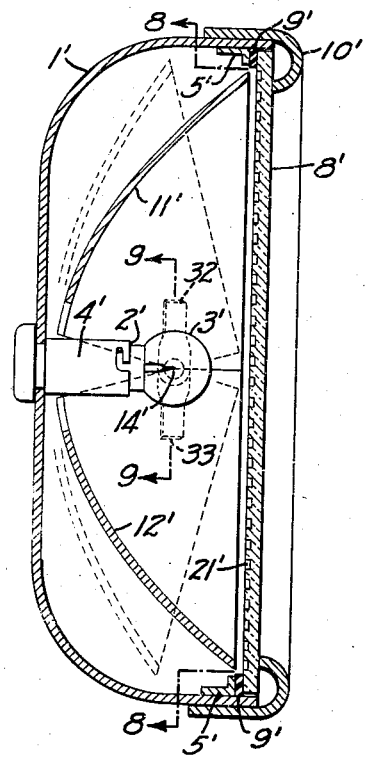
Figure 7 is a transverse sectional view of a light projector embodying another form of my invention in which the reflectors are mounted for independent rotation about an axis.
Figure 8:
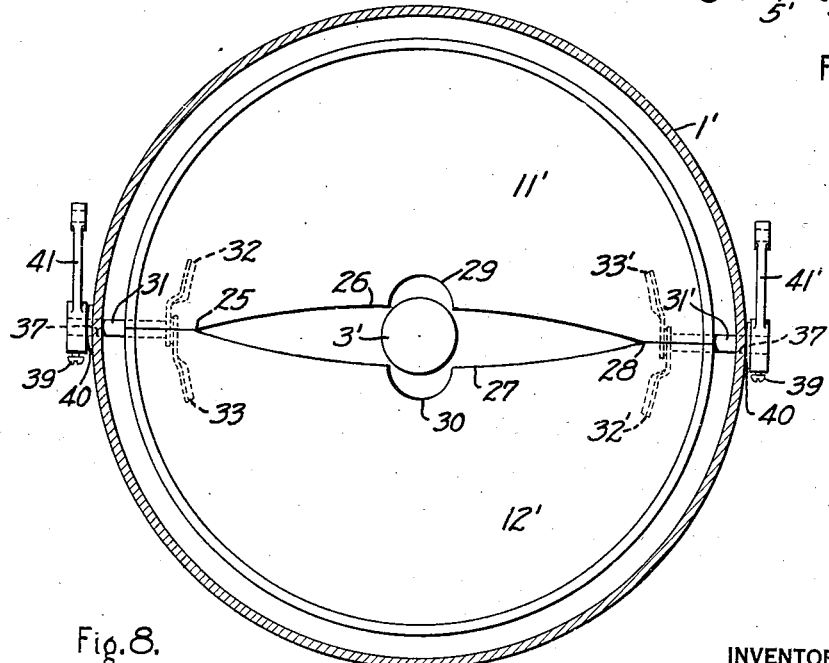
Figure 8 is a vertical sectional view of the projector taken in the plane indicated by line 8—8 in Figure 7.

Figures 7, 8 and 9 illustrate in detail another embodiment of my invention comprising a casing 1' having a lamp socket 2', adapted to hold an electric lamp 3', mounted therein on a support 4'. A lens 8' and resilient gasket 9' are held against an internal flange 5' by means of the rim 10' in a conventional manner.

Two reflectors 11' and 12' each preferably conforming in shape to a portion of the surface of a paraboloid, are mounted within the casing for independent rotation. In the particular embodiment of my invention here illustrated, the reflectors are confocal, the common focus coinciding with the position of the lamp filament 14', and are mounted for rotation about a line through the common focus in a direction perpendicular to the paraboloidal axes. To this end bearing holes 37 and 37', aligned with the lamp filament, are provided in opposite sides of the casing 1'. Spindles 31 and 31' pass through these holes in axial alignment and are adapted to rotate therein. The inner end of the spindle 31 passes through a bearing hole 36 in the loose strap 32 and is keyed or otherwise secured against rotation in the hole 35 in the fixed strap 33. The strap 32, which is free to rotate about the spindle, is separated from the fixed strap by an antifriction collar 34. The spindle 31' is similarly secured to a fixed strap 33' and provided with a free strap 32'.

Straps 32 and 33' are adapted to conform to the convex surface of the reflector 11' and are soldered or otherwise affixed thereto in such manner that the axis of the paraboloid passes through the position occupied by the lamp filament 14' in a direction perpendicular to the axis of the aligned spindles. In the same manner the reflector 12' is soldered or otherwise affixed to the straps 32' and 33 so that the axis of the paraboloid is perpendicular to the axis of the spindles at the point occupied by the lamp filament. The end of spindle 31 which projects outside the casing is fitted into the hole 38 in the hub of the lever 41 and is secured against rotation therein by a set-screw 39. The hub of the lever is separated from the surface of the casing by an anti-friction collar 40. In the same manner a lever 41' is secured to the outer end of the spindle 31'. Adjacent edges of the reflectors 11' and 12' are cut away along the lines 25—26—28 and 25—27—28 lying in pivotal planes, thus providing clearance to permit relative rotation, and semi-circular notches 29 and 30 are cut centrally therein to provide clearance for the socket support 4' when the reflectors are in extreme open position. Thus the angular positions of the reflectors 11' and 12' may be varied by movement of the levers 41' and 41 respectively on the outside of the casing.

In the embodiment of my invention illustrated in Figure 7 I have shown the reflectors so mounted that when in the positions indicated by the solid lines the paraboloidal axes are parallel, and, when in the positions indicated by the broken lines the paraboloidal axes are divergent. It is to be understood, however, that I do not limit myself to this arrangement and that the angular relation between the axes in either one of the extreme positions occupied by the reflectors may be divergent, parallel or convergent to accord with the use for which the projector is intended as well as practical considerations of construction. It is to be further understood that the reflectors may be formed other than paraboloidally, that they may be mounted in other than confocal relation, and that either may be mounted for rotation about a point or points in any arbitrarily located line; all without departing from the spirit of my invention.

Means is provided for dispersing light from either or both of the reflectors as determined by the angularity of the light flux therefrom with reference to such means which comprises a plate 8', of transparent material, adapted to form a closure for the open end of the casing and having a plurality of rectangular channels 21' formed on its inner surface. When the reflectors are in the position shown by the full lines in Figure 5 the emergent light of the projector will hereby be in the form of an intense beam of substantially parallel rays, capable of providing adequate illumination on objects with small angular separation located at a considerable distance from the projector. As the reflectors are tilted back toward the positions indicated by the broken lines the rays therefrom will be subject to dispersion in planes perpendicular to the pivotal axis of rotation, so that the emergent light of the projector will be dispersed in a flat fan-like formation capable of providing the same degree of illumination as before on objects with considerable plane angular separation located near the projector. Other dispersion patterns may be secured by utilizing different shapes and arrangements of the irregularities on the surface of the dispersion lens, as has been explained above. Further, other dispersion means may be employed and it is to be understood that all fall within the scope of my invention as defined in the claims which follow.

I claim:

1. In a light projector comprising a casing having a source of light therein, the combination of a planar lens capable of passing without dispersion light rays lying in paths perpendicular to the surface thereof and of dispersing light rays lying in paths forming acute angles with said surface, a pair of confocal reflectors, and means for pivotally mounting said reflectors within said casing for independent rotation about axes passing through the common focal point, one of said reflectors being adapted to direct light from said source along paths lying normal to the surface of said lens and the other of said reflectors being adapted to direct light from said source along paths lying at acute angles to the surface thereof.

2. In a light projector comprising a casing having a source of light therein, the combination of a planar lens capable of passing without dispersion light rays lying in paths perpendicular to the surface thereof and of dispersing light rays lying in paths forming acute angles with said surface, a pair of confocal reflectors, means for pivotally mounting said reflectors within said casing for independent rotation about axes passing through the common focal point, one of said reflectors being adapted to direct light from said source along paths lying normal to the surface of said lens and the other of said reflectors being adapted to direct light from said source along paths lying at acute angles to the surface thereof, and means for effecting rotation of said reflectors to alter the angles of light rays reflected therefrom with respect to the surface of said lens.

3. In a light projector comprising a casing having a fixed source of light therein, the combination of a lens capable of transmitting without dispersion light rays cast in paths perpendicular to the surface thereof and of dispersing and transmitting light rays cast thereon at an acute angle to said surface, a pair of confocal conjoined reflectors, means for mounting said reflectors within said casing in parallel pivotal planes, said reflectors being independently rotatable about axes passing through the common focal point, one of said reflectors being adapted to reflect light from said source along paths perpendicular to the surface of said lens and the other of said reflectors being adapted to reflect light from said source along paths lying at acute angles to said surface, and means external of said casing for effecting rotation of said reflectors to alter the angles of said light rays with respect to the surface of said lens.

GEORGE E. SMITHBURN.